(12) United States Patent
Kuo

(10) Patent No.: US 7,868,220 B2
(45) Date of Patent: Jan. 11, 2011

(54) DEGRADATION OF PHOSPHATE ESTERS BY MOLYBDOCENE AND TUNGSTOCENE DERIVATIVES

(75) Inventor: Louis Kuo, Portland, OR (US)

(73) Assignee: Lewis & Clark College, Portland, OR (US)

( * ) Notice: Subject to any disclaimer, the term of this patent is extended or adjusted under 35 U.S.C. 154(b) by 642 days.

(21) Appl. No.: 11/953,148

(22) Filed: Dec. 10, 2007

(65) Prior Publication Data

US 2010/0137672 A1      Jun. 3, 2010

(51) Int. Cl.
*A62D 3/35*      (2007.01)
(52) U.S. Cl. .................. 588/317; 588/401; 588/405
(58) Field of Classification Search .......... 588/317, 588/401, 405
See application file for complete search history.

(56) References Cited

U.S. PATENT DOCUMENTS 6,723,891 B1      4/2004   Wagner et al.

OTHER PUBLICATIONS

Adint, Tyler, "Hydrolysis of VX structural mimic using molybdocene and other metal compounds", May 3, 2007, Thesis presented to Department of Chemistry, 37 pages.
Ahmed, Takiya J. et al., "Organometallic Catalysis in Aqueous Solution. They Hydrolytic Activity of a Water-Soluble ansa-Molybdocene Catalyst", Organometallics 2007, 26, pp. 5179-5187.
Chanda, Arani et al., "Total Degradation of Fenitrothion and Other Organophosphorus Pesticides by Catalytic Oxidation Employing Fe-TAML Peroxide Activators", J. Am. Chem. Soc. 2006, 128, pp. 12058-12059.
Keizer, Timothy S. et al., "Catalytic Dealkylation of Phosphates with Binuclear Boron Compounds", J. Am. Chem. Soc. 2002, vol. 124, No. 9, pp. 1864-1865.
Koca, Jaroslav et al., "Mobility of the Active Site Bound Paraoxon and Sarin in Zinc-Phosphotriesterase by Molecular Dynamics Simulation and Quantum Chemical Calculation", J. Am. Chem. Soc. 2001, 123, pp. 817-826.
Lewis, Vincent E., "Mechanism and Stereochemical Course at Phosphorus of the Reaction Catalyzed by a Bacterial Phosphotriesterase", Biochemistry 1988, 27, pp. 1591-1597.
Michalkova, A. et al., "Adsorption of Sarin and Soman on Dickite: An ab Initio ONIOM Study", J. Phys. Chem. B 2004, 108, pp. 1918-1930.
Michalkova, A. et al., "Theoretical Study of the Adsorption and Decomposition of Sarin on Magnesium Oxide", J. Phys. Chem. B 2004, 108, pp. 5294-5303.
Mortland, M. M., et al., "Catalytic Hydrolysis of Some Organic Phosphate Pesticides by Copper (II)", Hydrolysis of Phosphate, Department of Soil Science, vol. 15, No. 1, Jan.-Feb. 1967, pp. 163-167.
Moss, Robert A. et al., "Stereochemical Study of Phosphonothioate Cleavage by a Metallomicelle", Organic Letters, 2002, vol. 4, No. 11, pp. 1835-1838.
Moss, Robert A. et al., "Cleavage of VX Simulants by Micellar Iodoso- and Iodoxybenzoate", Langmuir 1999, 15, pp. 2738-2744.
Moss, Robert A. et al., "Kinetics of Cleavage of Thiophosphates and Phosphonothioates by Micellar Iodosocarboxylates and Copper Metallomicelles", Langmuir 2000, 16, pp. 6485-6491.
Smolen, Jean M. et al., "Divalent Metal Ion-Catalyzed Hydrolysis of Phosphorothionate Ester Pesticides and Their Corresponding Oxonates", Environ. Sci. Technol. 1997, 31, pp. 1664-1673.
Torrets, Alba et al., "Oxide Surface-Catalyzed Hydrolysis of Carboxylate Esters and Phosphorothioate Esters", Soil Sci. Soc. Am. J., (1994), 58:738-745.
Tsang, Josephine S. et al., "Billion-fold Acceleration of the Methanolysis of Paraoxon Promoted by La(OTf)3 in Methanol", J. Am Chem. Soc. 2003, 125, pp. 7602-7607.
Vanhooke, Janeen L. et al., "Three-Dimensional Structure of the Zinc-Containing Phosphotriesterase with the Bound Substrate Analog Diethyl 4-Methylbenzyphosphonate", Biochemistry 1996, 35, pp. 6020-6025.
Wagner, George W. et al., "Reactions of VX, GD, and HD with Nanosize MgO", J. Phys. Chem. B 1999, 103, pp. 3225-3228.
Wagner, George W. et al., "Reactions of VX, HD, and Their Simulants, with NaY and AgY Zeolites. Desulfurization of VX and AgY", Langmuir 1999, 15, pp. 8113-8118.
Wan, Hai Ben et al., "Mercury(II) Ion-Promoted Hydrolysis of Some Organophosphorus Pesticides", Pestic Sci. 1994, 42, pp. 93-99.
Yang, Yu-Chu et al., "Autocatalytic Hydrolysis of V-Type Nerve Agents", J. Org. Chem. 1996, 61, pp. 8407-8413.
Yang, Yu-Chu, "Chemical Detoxification of Nerve Agent VX", Acc. Chem. Res. 1999, 32, pp. 109-115.
Yang, Yu-Chu et al., "Perhydrolysis of Nerve Agent VX", J. Org. Chem. 1993, 58, pp. 6964-6965.

*Primary Examiner* — Edward M Johnson
(74) *Attorney, Agent, or Firm* — McKee, Voorhees & Sease, P.L.C.

(57) ABSTRACT

Degradation of phosphate esters, particularly neurotoxins and pesticides, is performed using metallocene derivatives, more particularly molybdocene and tungstocene derivatives. A metallocene derivative is hydrolyzed and then reacted with a phosphate ester. The preferred metallocene derivatives are molybdocene and tungstocene derivatives. The phosphate esters can include, but are not limited to, VX, VE, VG, VM, GB, GD, GA, GF, parathion, paraoxon, triazophos, oxydemeton-methyl, chlorpyrifos, fenitrothion and pirimiphos-methyl, representing both chemical warfare agents as well as pesticides and insecticides.

17 Claims, 3 Drawing Sheets

DEGRADATION OF PHOSPHATE ESTERS BY MOLYBDOCENE AND TUNGSTOCENE DERIVATIVES

GRANT REFERENCE

This invention was made with government support under CHE-0353016 awarded by NSF. The government has certain rights in the invention.

BACKGROUND OF THE INVENTION

1. Field of the Invention

The present invention relates in general to a method for the degradation of phosphate esters, particularly neurotoxins and pesticides, by metallocene derivatives, more particularly molybdocene and tungstocene derivatives. The degradation of organophosphorus compounds such as phosphate esters are necessary to dispose of the unwanted phosphate esters, for purposes including but not limited to destroying existing supplies of phosphate esters and remediating contaminated soil and water.

2. Problems in the Art

Phosphate esters include numerous chemical warfare agents such as VX, pesticides and insecticides, further including paraoxon and parathion. Each of these compounds includes a phosphate ester bond, and irreversibly blocks a serine hydroxyl group within the enzyme acetylcholinesterase by phosphorylation, resulting in a disruption of a cell's neurologic function. VX (O-ethyl-S-[2-(diisopropylamino)ethyl]methylphosphonothioate) is a lethal phosphonothioate neurotoxin (LC50=0.135 mg/kg) with the formula

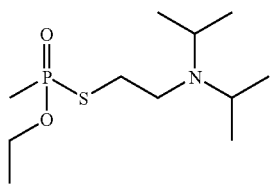

VX

Symptoms of exposure to VX include coughing, difficulty breathing, sweating, vomiting, urination/defecation, headache, tremors, unsteadiness and confusion, ultimately progressing to death. The United States has a stockpile of thousands of tons of VX that must be destroyed to comply with the Chemical Weapons Treaty of 1997. In addition, Russia is also known to possess quantities of VX.

Numerous phosphate esters are also used as pesticides which are toxic to unintended targets such as mammals. Examples include Paraoxon (O,O-diethyl-O-p-nitrophenylphosphoric acid) and Parathion (O,O-diethyl O-4-nitrophenyl phosphorothioate) with the respective formulas

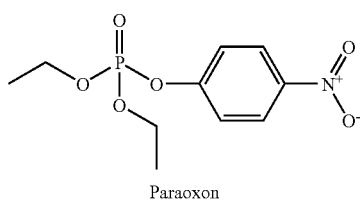

Paraoxon

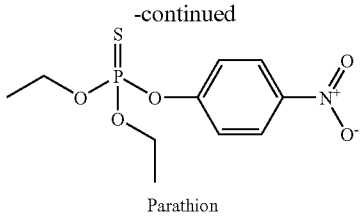

Parathion

Phosphate esters used as pesticides pollute soil and water with which they come in contact. The creation of phosphate esters for chemical warfare and use as pesticides results in the need for a safe and effective process of degradation in order to completely eliminate the compounds without persistent toxic environmental and medical effects. Much of the groundwork on degrading phosphate esters as nerve agents has been done on the pesticides paraoxon and parathion.

VX is degraded on a large scale by hydrolysis with concentrated aqueous sodium hydroxide, such as in 0.1 M NaOH, resulting in competing cleavage of the P—S and P—O esters, with approximately 87% P—S bond cleavage and 13% P—O bond cleavage (FIG. 1). This is problematic because the byproduct of the P—O bond cleavage, S-[2-(diisopropylamino)ethyl]methylphosphonic acid, has a toxicity comparable to VX and requires additional steps such as oxidative pretreatment for destruction. Caustic neutralization at 90° C. (16.6 wt. % VX, 8.8 wt. % NaOH, 74.6 wt. % $H_2O$) produces a similar ratio of bond cleavage, but allows S-[2-(diisopropylamino)ethyl]methylphosphonic acid to be broken down concurrently producing methyl phosphonic acid and thiolamine. However, this process requires specific control over both the pH and temperature of the reaction to ensure no byproducts are produced.

There is a need for a method to selectively cleave the P—S bond of the phosphate ester VX to eliminate the toxic byproducts of its degradation, so as not to require further degradation. Various additional aqueous compounds have been used in the degradation of VX, but are either unsuccessful at selectively cleaving the P—S bond or present commercial difficulties in their ability to be used in mass quantities. For example, aqueous potassium peroxymonosulfate selectively cleaves to the P—S bond in VX. However, the solubility of potassium peroxymonosulfate is limited at low pH and the oxidant decomposes at any pH above 5. Alternatively, the use of potassium peroxymonosulfate in polar organic solvents generates a toxic diphosphonate as a major byproduct.

Magnesium oxide and alumina are reported to degrade VX, but these methods are limited to surface chemistry. Other degradation methods for phosphonothioates include incineration and oxidation with peroxides. Incineration is a politically unpopular degradation method. Alternatively, hydrolytic degradation of phosphonothioates lacks selectivity and results in both P—O and P—S degradation pathways, resulting in toxic byproducts.

The known methods to degrade phosphate pesticides include hydrolysis by microorganisms, degradation or hydrolysis by Cu (II), Hg(II) and clays, surface catalyzed hydrolysis by $Al_2O_3$, $TiO_2$ and FeOOH (goethite), and hydrolysis by Rh (III) and Ir (III) coordination complexes that are overly expensive and the hydrolysis by the molydocene derivative, bis($\eta^5$-cyclopentadienyl)molybdenum (IV) dichloride ($Cp_2MoCl_2$). $Cp_2MoCl_2$ similarly hydrolyzes dimethyl phosphate, a phosphate ester that mimics the diester functionality of DNA.

The art is the field of the invention clearly illustrates an immediate need for a more selective degradation method for VX and related neurotoxins, as the safety and environmental impact of their degradation are of great concern to the public. There further exists a need to provide a degradation method for VX and related neurotoxins that does not produce toxic products. There is also a need for a degradation method for VX and related neurotoxins that operate at room temperature. There exists further a need for a degradation method for phosphate esters under conditions neither very acidic nor very basic, such as a pH between 4 and 10. There exists further a need to provide a faster method to degrade phosphate esters including neurotoxins and pesticides. More generally, there is a need for a fast and selective method to degrade phosphate esters. The present invention builds on the past work with metallocene catalysts to create a viable method of degrading phosphate esters.

BRIEF SUMMARY OF THE INVENTION

The present invention is related to a method of degrading phosphate esters, particularly neurotoxins and pesticides, by metallocene derivatives. The preferred metallocene derivatives are molybdocene and tungstocene derivatives. The method comprises hydrolyzing a metallocene derivative and reacting the hydrolyzed metallocene derivative with a phosphate ester. The phosphate esters can include, but are not limited to, VX, VE, VG, VM, GB, GD, GA, GF, parathion, paraoxon, triazophos, oxydemeton-methyl, chlorpyrifos, fenitrothion and pirimiphos-methyl, representing both chemical warfare agents as well as pesticides and insecticides.

The inventor has searched to find a method of degradation that results in the preferable chemical pathway of selective P—S bond scission, rather than P—O bond scission which produces a toxic byproduct requiring additional degradation steps. The inventor has overcome the failures of prior art by enabling a commercially viable method of degrading phosphate esters.

BRIEF DECRIPTION OF THE DRAWINGS

DETAILED DESCRIPTION OF THE PREFERRED EMBODIMENT

Figure 1:
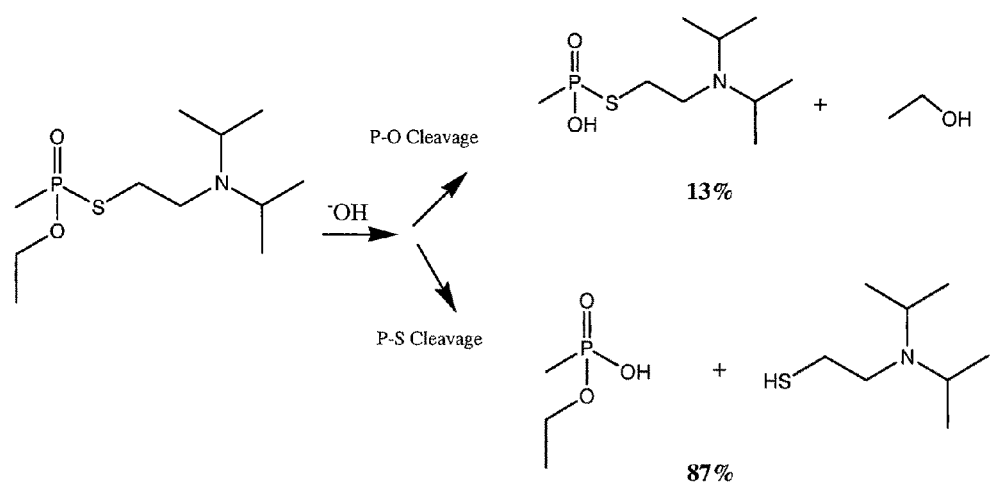
FIG. 1 illustrates VX degradation by aqueous base through two competing pathways.

In accordance with the purpose of the present invention described herein, a novel method is provided comprising: hydrolyzing a metallocene derivative; reacting the hydrolyzing metallocene derivative with a phosphate ester. One aspect of the present invention is to provide a fast and selective method for the degradation of phosphate esters.

A further aspect of the present invention is to provide a method for the degradation of phosphate esters under conditions neither very acidic nor very basic such as a pH between 4 and 10.

A further aspect of the present invention is to provide a method for phosphate ester degradation in both aqueous and non-aqueous solvents once a compound is dissolved.

A further aspect of the present invention is to provide a method for the degradation of phosphate esters near room temperature.

A further aspect of the present invention is to provide a faster method for the degradation of phosphate esters.

A further aspect of the present invention is to provide a method to destroy VX. A still further aspect of the present invention is to provide a method to destroy VX related neurotoxins.

In yet another aspect of the present invention, a method to degrade phosphate ester pesticides is provided.

The method, in its simplest form, comprises the steps of hydrolyzing a molybdocene or tungstocene derivative and reacting the hydrolyzed molybdocene and tungstocene derivative with a phosphate ester. Phosphate esters, for the purpose of this invention, include the following classes:

Phosphinate    Thiophosphate    Phosphonothioate

Thiophosphinate    Phosphonate    Thophosphonate

Phosphorothiolate    Thionophosphinate $R^a$-$R^c$ are selected from the group consisting of hydrogen atoms, halides, R, OR, OCOR, SR, $NR_2$ and $PR_2$. R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals, optionally containing one heteroatom and multiple heteroatoms belonging to groups 13-17 of the Periodic Table. $R^a$-$R^c$ may also be joined to form five-member and six-member rings which include P.

Molybdocene and tungstocene derivatives have the respective formulas:

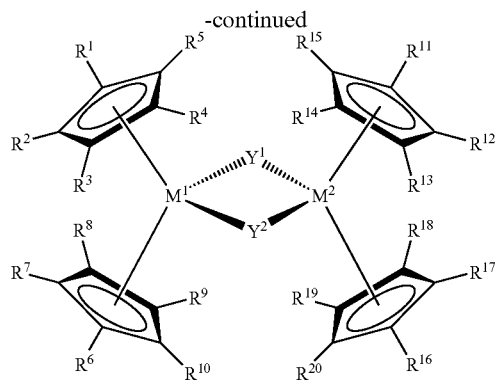

$R^1$-$R^{20}$ are the same or different, and may also be joined to form bridges and five-member and six-member rings, and are selected from the group consisting of hydrogen atoms, halides, R, OR, OCOR, SR, $NR_2$ and $PR_2$. R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals, and may also contain one heteroatom or multiple heteroatoms belonging to groups 13-17 of the Periodic Table. Preferably $R^1$-$R^{20}$ are electron donating groups including alkyl, alcohol, amino and phosphino. Most preferably $R^1$-$R^{20}$ are hydrogen atoms, methyl or t-butyl. $M^1$ and $M^2$ are molybdenum or tungsten. Mo and W are both Group 6 transition metals and are chemically similar.

$X^1$ and $X^2$ are selected from the group consisting of hydrolyzable anions. $X^1$ and $X^2$ dissociate from $M^1$ and $M^2$ upon hydrolysis. Molybdocene and tungstenocene derivatives do not degrade phosphate esters until after $X^1$ and $X^2$ dissociate from $M^1$. Examples of $X^1$ and $X^2$ are hydride, halides, OH, OR, $OSO_2CF_3$, $N(SO_2CF_3)_2$, $N(SO_2CF_2CF_3)_2$, $C(SO_2CF_3)_3$, $BF_4$, $PF_6$, $AsF_6$, $ClO_4$, $NO_3$, $IO_3$, CN, SCN, OCN, $HCO_2$, OCOR, SR, $NR_2$ and $PR_2$, wherein R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ heteroatoms belonging to groups 13-17 of the Periodic Table. Halides include fluoride, chloride, bromide and iodide. $X^1$ and $X^2$ are preferably halides or $OSO_2CF_3$ (Tf). More preferably, $X^1$ and $X^2$ are chloride or Tf.

$Y^1$ and $Y^2$ are selected from the group consisting of O, S, OH, SH, OR and SR wherein R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals, which may contain one heteroatom and multiple heteroatoms belonging to groups 13-17 of the Periodic Table. Oxygen and sulfur are both Group 16 non-metals and are chemically similar.

Examples of molybdocene and tungstocene derivatives include, respectively:

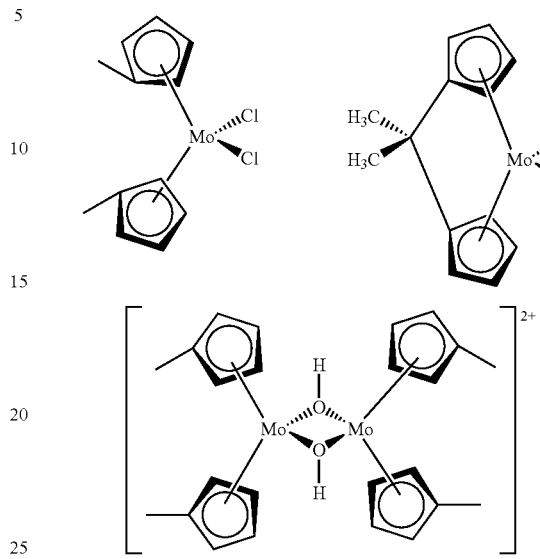

Preferred molybdocene and tungstocene derivatives include $Cp_2MoCl_2$, $(MeCp)_2MoCl_2$, $(t-BuCp)_2MoCl_2$, $Cp^*_2MoCl_2$, $Cp_2Mo(OTf)_2$, $(MeCp)_2Mo(OTf)_2$, $(t-BuCp)_2Mo(OTf)_2$, $Cp^*_2Mo(OTf)_2$, $Cp_2WCl_2$, $(MeCp)_2WCl_2$, $(t-BuCp)_2WCl_2$, $Cp^*_2WCl_2$, $Cp_2W(OTf)_2$, $(MeCp)_2W(OTf)_2$, $(t-BuCp)_2W(OTf)_2$ and $Cp^*_2W(OTf)_2$ where Me is methyl, t-Bu is tert-butyl, Cp is cyclopentadienyl and Cp* is pentamethylcyclopentadienyl. Particularly preferred metallocene derivatives include $Cp_2Mo(OTf)_2$, $(MeCp)_2Mo(OTf)_2$, $(t-BuCp)_2Mo(OTf)_2$ and $Cp^*_2Mo(OTf)_2$.

Figure 2:
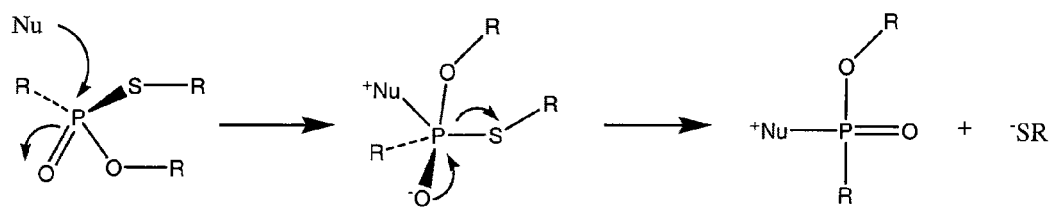
FIG. 2 illustrates the mechanism by which the P—S bond in a phosphonothioate is cleaved.
Figure 3:
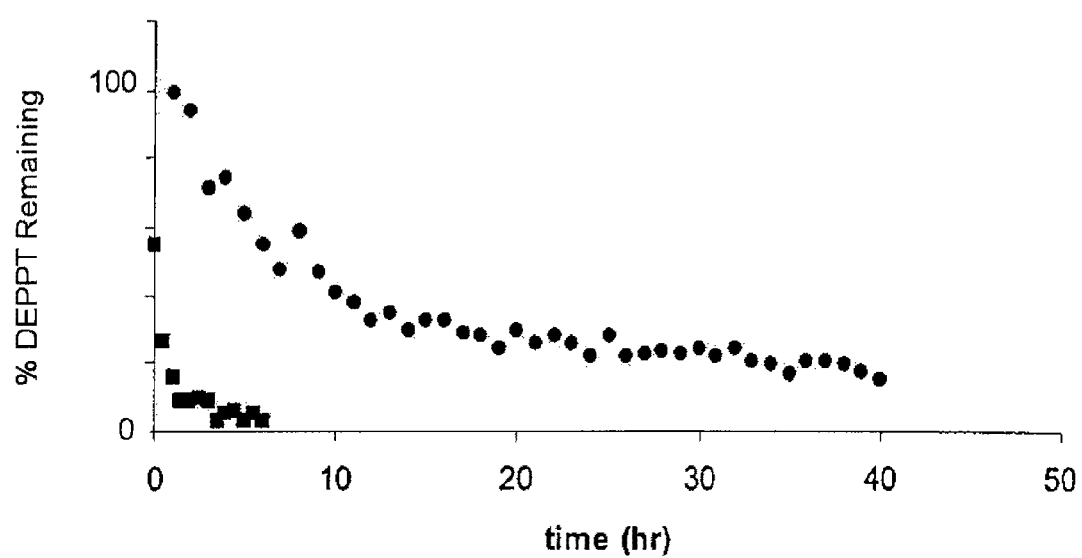
FIG. 3 is a graph illustrating that $(MeCp)_2MoCl_2$ (squares) hydrolyzes DEPPT more quickly and more completely than $Cp_2MoCl_2$ (circles).

Unexpectedly, if $R^1$-$R^{20}$ are, on balance, electron donating, the rate at which molybdocene and tungstocene derivatives degrade phosphate esters is increased. While not being limited to any particular theory, it is believed that electron donating groups make $M^1$ and $M^2$ more powerful nucleophiles to attack the P in phosphate esters. FIG. 2 illustrates the mechanism of phosphonothioate degradation where the molybdocene or tungstenocene nucleophile is represented as Nu.

VX related neurotoxins include, but are not limited to, V and G series nerve agents. V series nerve agents include, but are not limited to, VX, VE (S-(Diethylamino)ethyl O-ethyl ethylphosphonothioate), VG (O,O-Diethyl-S-[2-(diethylamino)ethyl]phosphorothioate) and VM (O-Ethyl-S[2-(diethylamino)ethyl]methylphosphonothioate). G series nerve agents include, but are not limited to, GB(O-Isopropyl methylphosphonofluoridate), GD (O-Pinacolyl methylphosphonofluoridate), GA (Ethyl N,N-dimethylphosphoramidocyanidate) and GF (cyclohexyl methylphosphonofluoridate)

Phosphate ester pesticides include, but are not limited to, parathion, paraoxon, triazophos (O,O-diethyl O-1-phenyl-1H-1,2,4-triazol-3-yl phosphorothioate), oxydemeton-methyl (S-2-(ethylsulfinylethyl O,O-dimethyl) phosphorothioate), chlorpyrifos (O,O-diethyl O-3,5,6-trichloro-2-pyridyl phosphorothioate), fenitrothion (O,O-dimethyl O-4-nitro-m- tolyl phosphorothioate) and pirimiphos-methyl (O-2-diethylamino-6-methylpyrimidin-4-yl O,O-dimethyl phosphorothioate).

EXAMPLES

The following examples incorporate the following reaction conditions and parameters. These descriptions are intended to illustrate and not limit in any manner the present invention.

Using DEPPT as a structural analog of VS allows examination of hydrolysis methods in a reasonable manner with similar chemical activity as VX. DEPPT contains both P—O and P—S bonds, making it ideal to examine where cleavage will take place if the technique is applied to other phosphonothioates.

The concentration of metallocenes is a significant parameter of the present invention. For example, $(MeCp)_2MoCl_2$ is unexpectedly soluble in water concentrations up to about 500 mM. The specific volume is not a central limitation, rather the concentration and solubility of the metallocenes and organophosphorus compounds are important limits.

The temperature parameters for the metallocenes are effectively limited to from 0° C. to 100° C. The aqueous solvent will freeze below 0° C. and the mixed solvent system (acetone, tetrahydrofuran, water) will significantly evaporate above 50° C. The temperature could be increased as high as 100° C. in a high pressure reactor to prevent evaporation.

Finally, all NMR-scale reactions do not require stirring to dissolve the metallocene. Notably, a preparative scale would require stirring.

The following examples are presented to further illustrate, but not limit, the invention and to assist one of ordinary skill to practice the invention.

Example 1

Control

O,S-diethyl phenylphosphonothioate (DEPPT) is a phosphonothioate and a structural analogue of VS. DEPPT was dissolved in a tetrahydrofuran/$D_2O$/acetone solution and monitored by nuclear magnetic resonance (NMR) spectroscopy at 50° C. No degradation of DEPPT by P—S or P—O bond scission was observed.

Example 2

Hydrolysis of DEPPT with $Cp_2MoCl_2$

DEPPT was added to an excess of $Cp_2MoCl_2$ in a tetrahydrofuran/$D_2O$/acetone solution under anaerobic conditions at 50° C. Tetrahydrofuran and acetone were spiked into the aqueous solution to dissolve the phosphonothioate. The following reaction took place as determined by NMR spectroscopy:

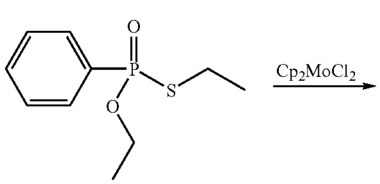

-continued

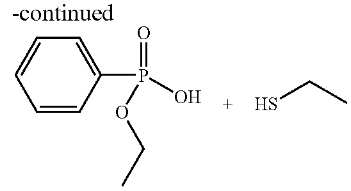

The result demonstrates that DEPPT was hydrolyzed by selective scission of the P—S bond by $Cp_2MoCl_2$. The comparison to Example 1, the control study, demonstrates that the reaction causing the scission of the P—S bond is due to the action of $Cp_2MoCl_2$.

Example 3

Hydrolysis of DEPPT with Other Organometallic Compounds

DEPPT was added to an excess of lanthanum (III) trifluoromethanesulfonate in a tetrahydrofuran/$D_2O$/acetone solution at 50° C. As monitored by NMR spectroscopy, no more than 5% of the DEPPT was hydrolyzed. The same results were obtained using ytterbium (III) trifluoromethanesulfonate and [2-(2-Pyridyl)phenyl-C,N]palladium (II) acetate. This demonstrates the uniqueness of the metallocene derivative chemistry demonstrated in Example 2.

Example 4

Hydrolysis of DEPPT: $Cp_2MoCl_2$ v. $(MeCp)_2MoCl_2$

The same reaction conditions were observed as in Example 2 except the reactions were performed at 25° C. NMR spectroscopy confirmed that both hydrolyses occurred with selective P—S cleavage. The results (FIG. 3) demonstrate that $(MeCp)_2MoCl_2$ hydrolyzes DEPPT more quickly and more completely than $Cp_2MoCl_2$.

What is claimed is:

1. A method for degrading a phosphate ester comprising:

hydrolyzing a metallocene derivative; and reacting the hydrolyzed metallocene derivative with a phosphate ester, wherein the metallocene derivative is selected from the group consisting of:

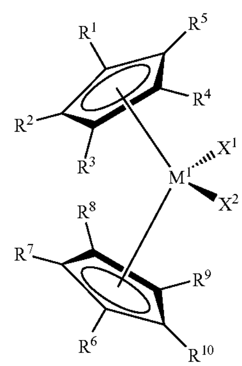

and

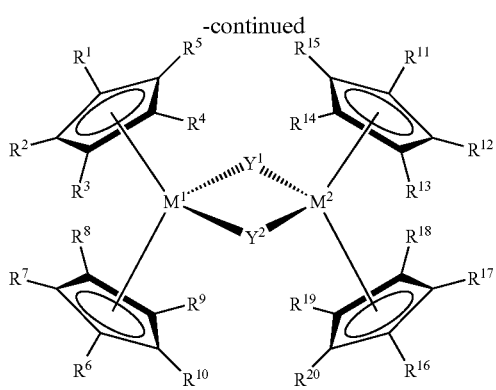

wherein $R^1$-$R^{20}$ are not all hydrogen; and wherein $M^1$ and $M^2$ are selected from the group consisting of molybdenum and tungsten;

wherein $X^1$ and $X^2$ are hydrolyzable anions;

wherein $Y^1$ and $Y^2$ are selected from the group consisting of O, S, OH, SH, OR and SR wherein R is further selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals; and wherein the phosphate ester is selected from the group consisting of:

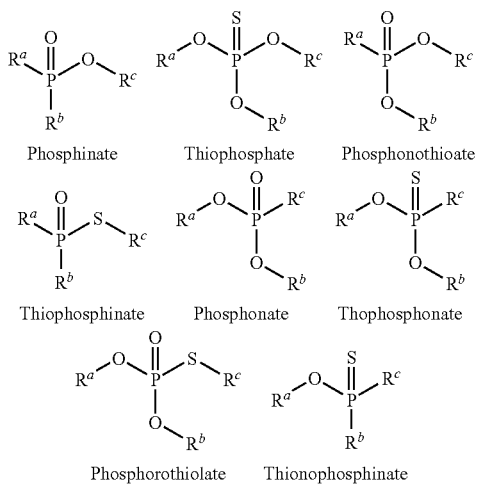

2. The method of claim 1 wherein $R^1$-$R^{20}$ are joined to form bridges, five-member or six-member rings, and are selected from the group consisting of hydrogen atoms, halides, R, OR, OCOR, SR, $NR_2$ and $PR_2$, wherein R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals.

3. The method of claim 2 wherein R contains at least one heteroatom belonging to groups 13-17 of the Periodic Table.

4. The method of claim 1 wherein $R^a$-$R^c$ may be joined to form five-member and six-member rings which include P, and are selected from the group consisting of hydrogen atoms, halides, R, OR, OCOR, SR, $NR_2$ and $PR_2$ wherein R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals.

5. The method of claim 4 wherein R contains at least one heteroatom belonging to groups 13-17 of the Periodic Table.

6. The method of claim 1 wherein the hydrolyzable anions are selected from the group consisting of hydride, halides, OH, OR, $OSO_2CF_3$, $N(SO_2CF_3)_2$, $N(SO_2CF_2CF_3)_2$, $C(SO_2CF_3)_3$, $BF_4$, $PF_6$, $AsF_6$, $ClO_4$, $NO_3$, $IO_3$, CN, SCN, OCN, $HCO_2$, OCOR, SR, $NR_2$ and $PR_2$, wherein R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals.

7. The method of claim 6 wherein R contains at least one heteroatom belonging to groups 13-17 of the Periodic Table.

8. The method of claim 1 wherein the metallocene derivative is selected from the group consisting of $(MeCp)_2MoCl_2$, $(t$-$BuCp)_2MoCl_2$, $Cp*_2MoCl_2$, $Cp_2Mo(OTf)_2$, $(MeCp)_2Mo(OTf)_2$, $(t$-$BuCp)_2Mo(OTf)_2$, $Cp*_2Mo(OTf)_2$, $Cp_2WCl_2$, $(MeCp)_2WCl_2$, $(t$-$BuCp)_2WCl_2$, $Cp*_2WCl_2$, $Cp_2W(OTf)_2$, $(MeCp)_2W(OTf)_2$, $(t$-$BuCp)_2W(OTf)_2$ and $Cp*_2W(OTf)_2$.

9. The method of claim 1 wherein the metallocene derivative is selected from the group consisting of $Cp_2Mo(OTf)_2$, $(MeCp)_2Mo(OTf)_2$, $(t$-$BuCp)_2Mo(OTf)2$ and $Cp*_2Mo(OTf)_2$.

10. The method of claim 1 wherein the phosphate ester is selected from the group consisting of VX, VE, VG, VM, GB, GD, GA, GF, parathion, paraoxon, triazophos, oxydemeton-methyl, chlorpyrifos, fenitrothion and pirimiphos-methyl.

11. A method for degrading a phosphate ester comprising:

hydrolyzing a metallocene derivative; and reacting the hydrolyzed metallocene derivative with a phosphonothioate with the formula

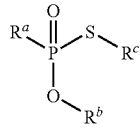

wherein the metallocene derivative is selected from the group consisting of

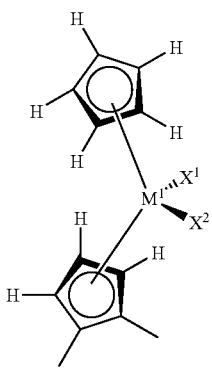

-continued

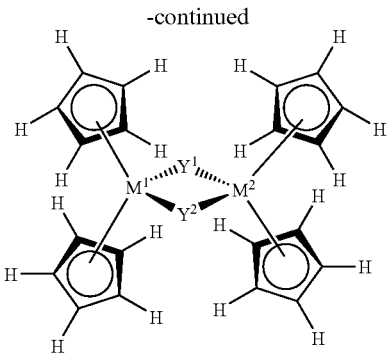

wherein M is selected from the group consisting of molybdenum and tungsten;
wherein $X^1$ and $X^2$ are hydrolyzable anions;
wherein $Y^1$ and $Y^2$ are selected from the group consisting of O, S, OH, SH, OR and SR, wherein R is further selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals.

12. The method of claim 11 wherein $R^a$-$R^c$ may be joined to form five-member and six-member rings which include P and are selected from the group consisting of hydrogen atoms, halides, R, OR, OCOR, SR, $NR_2$ and $PR_2$ wherein R is selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals.

13. The method of claim 11 wherein R contains at least one heteroatom belonging to groups 13-17 of the Periodic Table.

14. The method of claim 11 wherein the hydrolyzable anions are selected from the group consisting of hydrogen atoms, halides, OH, OR, $OSO_2CF_3$, $N(SO_2CF_3)_2$, $N(SO_2CF_2CF_3)_2$, $C(SO_2CF_3)_3$, $BF_4$, $PF_6$, $AsF_6$, $ClO_4$, $NO_3$, $IO_3$, CN, SCN, OCN, $HCO_2$, OCOR, SR, $NR_2$ and $PR_2$, wherein R is further selected from the group consisting of linear, branched, saturated and unsaturated $C_1$-$C_{20}$ alkyl, $C_3$-$C_{20}$ cycloalkyl, $C_6$-$C_{20}$ aryl, $C_7$-$C_{20}$ alkylaryl, $C_7$-$C_{20}$ arylalkyl radicals.

15. The method of claim 14 wherein R contains at least one hetroatom belonging to groups 13-17 of the Periodic Table.

16. The method of claim 11 wherein the metallocene derivative is from the group consisting of $Cp_2MoCl_2$, $Cp_2Mo(OTf)_2$, $Cp_2WCl_2$, $Cp_2W(OTf)_2$.

17. The method of claim 11 wherein the phosphate ester is selected from the group consisting of VX, VE, VG, VM, GB, GD, GA and GF.

* * * * *

UNITED STATES PATENT AND TRADEMARK OFFICE
CERTIFICATE OF CORRECTION

PATENT NO. : 7,868,220 B2  Page 1 of 1
APPLICATION NO. : 11/953148
DATED : January 11, 2011
INVENTOR(S) : Louis Kuo It is certified that error appears in the above-identified patent and that said Letters Patent is hereby corrected as shown below:

Col. 9, Claim 1, line 44:

DELETE after Phosphonate "Thophosphonate"
ADD after Phosphonate --Thiophosphonate--

Signed and Sealed this
Twenty-second Day of February, 2011

David J. Kappos
*Director of the United States Patent and Trademark Office*